United States Patent [19]

Schwab et al.

[11] Patent Number: 5,359,887

[45] Date of Patent: Nov. 1, 1994

[54] PRESSURE SENSITIVE PAINT FORMULATIONS AND METHODS

[76] Inventors: Scott D. Schwab, 3441 Riverchase Pkwy., St. Charles, Mo. 63301; Ram L. Levy, 1622 Parquet Ct., St. Louis, Mo. 63146

[21] Appl. No.: 924,145

[22] Filed: Aug. 3, 1992

[51] Int. Cl.[5] .......................... G01M 9/00; G01L 9/00
[52] U.S. Cl. ........................................ 73/147; 73/705; 436/138; 374/143
[58] Field of Search ..................... 73/147, 705; 252/301.34, 301.35, 86; 428/64; 374/143, 131, 161; 436/136, 138

[56] References Cited

U.S. PATENT DOCUMENTS

| | | | |
|---|---|---|---|
| 3,230,764 | 1/1966 | Bloxsom et al. | 73/147 |
| 3,612,866 | 10/1971 | Stevens | 250/71 |
| 3,787,874 | 1/1974 | Urban | 346/1 |
| 3,890,835 | 6/1975 | Dötzer et al. | 73/147 |
| 4,075,493 | 2/1978 | Wickersheim | 250/461 |
| 4,215,275 | 7/1980 | Wickersheim | 250/459 |
| 4,560,286 | 12/1985 | Wickersheim | 374/131 |
| 4,618,694 | 10/1986 | Iden et al. | 252/301.35 |
| 4,752,115 | 6/1988 | Murray et al. | 350/96.29 |
| 4,789,992 | 12/1988 | Wickersheim | 374/161 |
| 4,810,655 | 3/1989 | Khalil et al. | 436/138 |
| 4,819,658 | 4/1989 | Kolodner | 128/736 |
| 4,954,269 | 9/1990 | Lo et al. | 252/86 |
| 5,043,285 | 8/1991 | Surgi | 436/136 |
| 5,043,286 | 8/1991 | Khalil et al. | 436/136 |
| 5,186,046 | 2/1993 | Gouterman et al. | 73/147 |

OTHER PUBLICATIONS

"A New Optical Pressure Measurement System (OPMS)", Arne Vollan et al., *IEEE*, 1991.

"Spectroscopic Characterization of Complexes of Ruthenium (II) and Iridium (III) . . . ", R. J. Watts & G. A. Crosby, *Journal of the American Chemical Society*, 93:13 (3184) 1971.

"Substituted Propyne Polymers—Part II, Effects of Aging . . . ", Michael Langsam & Lloyd M. Robeson, *Polymer Engineering and Science*, 29:1(44) 1989.

"New Technique of surface flow visualization . . . " John I. Peterson & Raphael V. Fitzgerald, *Rev. Sci. Instrum.* 51(5) May 1980 p. 670.

"Fiberoptic Oxygen Sensor Based on . . . " Ashutosh Sharman & Otto S. Wolfbeis, *Applied Spectorscopy*, 42:6(100) 1988.

"Photophysics and Photochemistry of Oxygen Sensors . . . " E. R. Carraway & N. J. Demas et al., *Anal. Chem.*, 63(337) 1991.

*Primary Examiner*—Richard E. Chilcot, Jr.
*Assistant Examiner*—William L. Oen

[57] ABSTRACT

A coating material for wind tunnel luminescent barometry of surfaces such as airfoils and airframes uses a resin such as poly[1-(trimethylsilyl)propyne], or a siloxane polymer, to carry a pressure indicator. The pressure indicator may be photoluminescent ruthenium complex, such as $[Ru(Ph_2phen)_2]Cl_2$, a photoluminescent platinum complex, such as PtOEP, and photoluminescent mixtures of pyrene and perylene.

30 Claims, 2 Drawing Sheets

PRESSURE SENSITIVE PAINT FORMULATIONS AND METHODS

BACKGROUND AND SUMMARY OF THE INVENTION

Applicants have developed a composition and method for use in photoluminescent barometry which greatly improves the sensitivity of methods of photoluminescent barometry. Applicants are aware of the following U.S. patents.

U.S. Pat. Nos. 3,230,764; 4,752,115; 3,612,866; 4,789,992; 3,787,874; 4,810,655; 3,890,835; 4,819,658; 4,075,493; 4,895,156; 4,215,275; 5,043,285; 4,560,286; 5,043,286.

The disclosures of the above patents are incorporated by reference herein.

The scientific literature includes: "Luminescent Barometry in Wind Tunnels," Janet Kavandi et al., *Rev. Sci. Instrum.* 61 (11), November 1990; "A New Optical Pressure Measurement System (OPMS)," Arne Vollan et al., IEEE, 1991, "Spectroscopic Characterization of Complexes of Ruthenium (II) and Iridium (III) with 4,4'-Diphenyl-2,2'-bipyridine and 4,7-Diphenyl-1,10-phenanthroline, R. J. Watts and G. A. Crosby, *Journal of the American Chemical Society*, 93:13(3184) 1971; "Mechanics of Gas Transport in Poly(1-Trimethylsilyl-1 Propyne)," S. R. Auvil et al., Polymer Preprints, 32:3(380) 1991; "Substituted Propyne Polymers—Part II. Effects of Aging on the Gas Permeability Properties of Poly[1-(trimethylsily) Propyne] for Gas Separation Membranes," Michael Langsam and Lloyd M. Robeson, *Polymer Engineering and science*, 29:1(44) 1989; "New technique of surface flow visualization based on oxygen quenching of fluorescence," John I. Peterson and Raphael V. Fitzgerald, *Rev. Sci. Instrum.* 51(5) May 1980 p. 670; "Fiberoptic Oxygen Sensor Based on Fluorescence Quenching and Energy Transfer," Ashutosh Sharma and Otto S. Wolfbeis, *Applied Spectroscopy*, 42:6(1009) 1988; and "Photophysics and Photochemistry of Oxygen Sensors Based on Luminescent Transition-Metal Complexes," E. R. Carraway and N. J. Demas et al., *Anal. Chem.*, 63(337) 1991. These publications are incorporated by reference herein.

The field of luminescent barometry is new and has been developed in response to the difficulties arising from conventional techniques used to determining pressure distributions over aerodynamic surfaces, such as, over the surfaces of an airfoil. These difficulties include the difficulty and cost of using mechanical or electronic pressure sensors on a surface. Sensors can disrupt the air flow over the surface and provide an erroneous reading. Errors may also arise due to the difficulty of using a sufficient number of sensors in an array to obtain realistic view of the phenomenon occurring. Many of these difficulties are described in detail in U.S. Pat. No. 3,787,874. More particularly, the aerodynamic forces acting on an aircraft model result largely from the distribution of pressure over the model surfaces. It is therefore common practice to measure surface pressures using a pressure model in the wind tunnel and compute the force distributions from the pressure data. Pressure models have hundreds of small (typically 0.02-inch diameter) pressure taps machined into their surfaces. These taps must be drilled precisely normal to the surface, with tight tolerances on location, diameter and even chamfer. In addition, each pressure tap must be connected to a pressure transducer module. There are usually too many taps to leave room for the transducers inside the model and hundred of thin stainless steel tubes must be used to establish connections to externally located transducers. The precision machining and the hand labor of installing the tubes is slow and costly: it usually takes nine months or more and about $1 million to build such a model. Moreover, overall forces and moments cannot always be measured accurately with conventional methods using pressure models, since the tubes connecting the pressure taps to the transducers can disrupt the airflow around the model and create inaccurate measurements of drag and lift.

Luminescent barometry has developed as a result of the discovery that surfaces may be coated with materials which are capable of being excited by light, such as ultraviolet light, and that these excited materials, will emit light which may be used as a measure of pressure on those surfaces. Many of these materials operate by an oxygen quenching phenomenon, that is the oxygen permeating through the binder which is applied to the surface is a function of the air pressure on the surface. The light emanating from the excited surface is an inverse function of the oxygen partial pressure and therefore the emitted light is an indication and measurement which can be correlated back to the pressure on the surface itself.

The techniques of photoluminescent barometry have been described in "A New Optical Pressure Measurement System (OPMS)," Vollan et al, 1991 IEEE and also in "Luminescent Barometry In Wind Tunnels," Kavandi et al., *Rev, sci. Instrum.*, 61 (11) November 1990. As described by Kavandi et al., a platinum complex, platinum octaethylporphyrin (PtOEP) has been shown to be a suitable photoluminescent compound which may be excited by ultraviolet radiation and used to map the pressure differentials across surfaces, such as airfoils. Other platinum complexes, such as platinum etioporphyrin, have been reported as emitters. The technique can be used on models measured in wind tunnels and can provide pressure distribution maps of the surfaces under examination. In addition to platinum octaethylporphyrin (PtOEP), applicants have found two additional classes of materials which are unexpectedly effective as luminescent barometry photo emitters, or active agents. These include ruthenium complexes and combinations of the organic compounds pyrene and perylene. Pyrene and perylene work as emitters when used in combination. Optimally an equimolar mixture is preferred, but it is not critical or essential. Formulations based on the emitter mixture of pyrene and perylene are most useful for a limited amount of time, probably due to one or both of the emitter compounds subliming out of the binder. Low pressures accelerate sublimation which restrict the useful pressure range of pyrene/perylene coatings to above about 2 psia.

Applicants' new materials have the additional unexpected property of being suitable to excitation by visible blue light as well as by ultra violet light and may be excited and measured by known methods. These latter materials may be incorporated in the silicone polymers described by Kavandi et al. However, applicants have discovered that a new group of cross-linked rubbery siloxane polymers and polyacetylene (polypropyne) polymers produce coatings having unexpectedly superior properties as photoluminescent coatings. A variety of these materials are available commercially from suppliers such as General Electric, Dow Chemical Co. and HULS under a variety of trademarks such as GE RTV 108, GE RTV 118, Dow 734, Dow 732, Dow 3140, HULS PS078.9 (solid polypropyne resin), HULS PS079.5 (polypropyne 5% solution) and equivalent materials. While it is not certain why these binder polymers provide such unexpected improvement in sensitivity, it is believed they have an ability to permit more oxygen, and more rapid oxygen absorption, through the surface to provide a quenching effect to the luminescence and thus a more sensitive reading of the pressure on a particular element of the surface being mapped.

The development of a successful pressure sensitive paint formulation requires not only the synthesis of a suitable active ingredient, but also an appropriate binder material. Efficient quenching of the luminescence requires that the molecules of the active ingredient be uniformly dispersed in a highly oxygen-permeable binder. To withstand the forces acting on the pressure sensitive paint coating during wind tunnel testing, the binder must adhere well to the model surface. To avoid disturbing the air flow, the binder must also be thin and smooth. The present invention meets these requirements and produces a pressure sensitive paint of unexpected sensitivity.

A variety of extenders and fillers may be added to the pressure sensitive paint. In particular silica fillers may be used to extend the pressure sensitive paint. Typical materials include fumed silicas of the type available under the trademark CABOSIL from Cabot Corporation. Silica gels may also be used, in particular, the grades known as TLC and HPLC may be used. When using fillers it is preferred to use a fine particle size to avoid imparting excessive surface roughness to a test model, although this is not critical. In addition, we have found that an unexpected interaction occurs when silica gel is used in conjunction with propyne resins. The combination imparts greatly enhanced sensitivity to pressure sensitive paint formulations. Why the increase occurs is not certain, but it is believed that this specific combination provides greatly enhanced permeability to the coating and thus increases the oxygen quenching effect. We believe that the high surface area and the specific surface characteristics of the silica gel may permit the molecules of the active ingredient to remain well-dispersed in an unaggregated state, and thus more accessible to oxygen quenching.

It is thus an object of the invention to produce a pressure sensitive paint, for use in methods of luminescent barometry, having greater sensitivity in mapping pressure distributions over aerodynamic surfaces.

It is further an object of the invention to produce a pressure sensitive paint, for use in methods of luminescent barometry, having greater oxygen permeability through the matrix of the paint.

It is an object of the invention to produce a pressure sensitive paint, for use in methods of luminescent barometry, having novel photoluminescent active agents.

It is an object of the invention to produce a photoluminescent paint, for use in methods of luminescent barometry, using ruthenium complexes as photoluminescent active agents.

It is an object of the invention to produce a photoluminescent paint, for use in methods of luminescent barometry, using pyrene and perylene photoluminescent agents.

It is a further object of the invention to produce a photoluminescent paint, for use in methods of luminescent barometry, which can be activated by visible blue light.

It is an object of the invention to produce an improved photoluminescent paint, for use in methods of luminescent barometry, containing silica gel to enhance the sensitivity of the paint matrix to oxygen quenching.

It is an object of the invention to produce a pressure sensitive paint, for use in methods of luminescent barometry, which has a cross-linked rubbery siloxane resin matrix.

It is a further object of the invention to produce a pressure sensitive paint, for use in methods of luminescent barometry, which uses poly [1-(trimethylsilyl)-propyne] as a binder.

These and further objects of the invention will be understood from the following Description of the Preferred Embodiments and the included Figures.

DESCRIPTION OF THE PREFERRED EMBODIMENTS

The ruthenium complexes used in preparing the photoluminescent paints produced herein were synthesized according to the procedure given by Watts and Crosby: R. J. Watts and G. A. Crosby, J. Amer,. Chem. Soc., "Spectroscopic Characterization of Complexes of Ruthenium (II) and Iridium (III) with 4,4'-Diphenyl-2,2'-bipyridine and 4,7-Diphenyl-1,10-phenanthroline, 93,3184(1971). The disclosure of this article is incorporated by reference herein.

In general, formulations of our pressure sensitive paint are effective for use in luminescent barometry to map pressure with compositions of from about 0–4% silica gel, from about 50–99% solvent, from about 0.5–30% binder, and from about 0.001–0.2% emitter. Preferred compositions of various pressure sensitive paint formulations which have been found effective are shown in Table I.

TABLE I

| | Silicone Rubber w/o Silica Gel | Silicone Rubber w/ Silica Gel | PTMSP w/o Silica Gel | PTMSP w/ Silica Gel |
|---|---|---|---|---|
| Binder (resin) | 6–30% | 1–3% | 0.5–2% | 0.5–2% |
| Dichloromethane (solvent) | 50–90 | 90–98 | 10–40 | — |
| RuPCl, PtOEP, RuTMPCl or Pyrene and Perylene, equimolar mixture (emitter) | 0.008–0.2 | 0.003–0.2 | 0.001–0.010 | 0.01–0.05 |
| Nonane, Octane or Mineral Spirits (solvent) Toluene | 1–10 | — | — | — |

TABLE I-continued

|  | Silicone Rubber w/o Silica Gel | Silicone Rubber w/ Silica Gel | PTMSP w/o Silica Gel | PTMSP w/ Silica Gel |
| --- | --- | --- | --- | --- |
| (solvent) | — | — | 70–95 | 95–99 |
| Silica Gel | — | 0.2–1.0 | — | 1–4 |

The invention may be understood more fully by referring to the following examples.

EXAMPLE 1

A coating for luminescent barometry, according to the invention, was prepared as follows, from:
- 7.58 g silicone resin (General Electric Corp. RTV 108 silicone rubber sealant)
- 255.0 g dichloromethane (Aldrich Chemical Co.)
- 1.36 g TLC plate silica gel (Fisher, Cat. No. 06-600A)
- 0.029 g tris(4,7-diphenyl-1,10-phenanthroline) ruthenium(II) chloride pentahydrate (RuPCl complex.)

The silica gel was removed from the TLC plate and activated in an oven at 120°C. for 1 hour. In a glass bottle, the silicone rubber sealant and ruthenium complex (RuPCl) were dissolved in the dichloromethane. Silica gel was added to the orange colored solution. The bottle was first shaken vigorously and then placed in an ultrasonic cleaner (Fisher Model FS9) for about 15 minutes, until all of the RuPCl was absorbed on the silica gel particles.

The paint was applied to the model surface (an F-15 model in this case) using conventional air brush techniques. Application occurred soon after ultrasonic treatment to avoid reagglomeration of the silica gel particles.

EXAMPLE 2

A coating for luminescent barometry, according to the invention, was prepared as follows, from:
- 79.1 g silicone resin (General Electric Corp. RTV 118 silicone rubber sealant)
- 532 g dichloromethane (Aldrich Chemical Co.)
- 37.5 g nonane (Aldrich Chemical Co.)
- 0.375 g RuPCl complex The silicone rubber sealant was dissolved in the dichloromethane in a glass bottle and the nonane was added. The resulting solution was shaken and then placed in the ultrasonic cleaner for about 15 minutes. The RuPCl was then added to the solution. Once the RuPCl had dissolved, the paint was applied to the model (MD-12X in this case) by spraying using conventional air brush techniques.

EXAMPLE 3

A coating for luminescent barometry, according to the invention, was prepared as follows, from:
- 15 g poly [1-(trimethylsilyl)propyne], (PTMSP) 1.1% solution in toluene
- 0.25 g TLC plate silica gel
- 0.005 g RuPCl complex The RuPCl complex was first dissolved in 15–20 g of dichloromethane. The silica gel was prepared and added to the mixture as described for Example 1. The combined mixture was mixed and sonicated and then the dichloromethane was allowed to evaporate. The 15 g of PTMSP solution was then added to the residue and this mixture was sonicated and used as the pressure sensitive paint.

EXAMPLE 4

A coating for luminescent barometry was prepared essentially as described for Example 3 from:
- 0.004 g [Ru(Ph₂phen)₃]Cl2, (RuPCl complex, tris(4,7-diphenyl-1,10-phenanthroline) ruthenium(II) chloride pentahydrate
- 7 g dichloromethane
- 11 g of 1.1% solution of PTMSP in toluene No silica gel was present in this formulation, so the steps for incorporation of this ingredient were omitted.

EXAMPLE 5

A coating for luminescent barometry, according to the invention, may also be made using PtOEP active complex, using the procedure of Example 4, from:
- 16.8 g PTMSP, 1.1% solution in toluene
- 5.1 g dichloromethane
- 0.25 mg PtOEP complex.

EXAMPLE 6

A coating for luminescent barometry, according to the invention, may also be made using PtOEP active complex, using the procedure of Example 3, from:
- 17.1 g PTMSP, 1.1% solution in toluene
- 0.24 g TLC plate silica gel
- 0.005 g PtOEP complex.

EXAMPLE 7

A coating for luminescent barometry was prepared essentially as described for Example 7 from:
- 1 g silicone resin, (Dow 732 silicone rubber)
- 1.5 mg pyrene
- 1.8 mg perylene The ingredients were combined in 7 g isooctane and thoroughly mixed in the ultrasonic cleaner as described in Example 2.

EXAMPLE 8

A coating for luminescent barometry was prepared essentially as described for Example 3 from:
- 0.003 g RuPCl complex
- 0.095 g Cabosil HS-5 (Cabot Corporation)
- 0.10 g dichloromethane
- 10.7 g PTMSP 1.1% solution in toluene The first three ingredients were mixed and sonicated. Then the dichloromethane was evaporated off. The residue was combined with the PTMSP solution and the mix was again sonicated. The prepared solution was used to prepare a test specimen.

EXAMPLE 9

A coating for luminescent barometry was prepared essentially as described in Example 4 from:
- 0.005 g RuPCl complex
- 1 g silicone resin (GE RTV 108 silicone rubber sealant)
- 15 g dichloromethane
- 0.75 g mineral spirits This material produced a very smooth coating.

EXAMPLE 10

A coating for luminescent barometry was prepared essentially as described for Example 4, from:
- 0.0035 g PTOEP
- 6.35 polydimethysiloxane in dioxane/tetrahydrofuran solvent (rubbery cross-linked siloxane) HULS PS252 (TM)

13.6 g dichloromethane

EXAMPLE 11

A coating for luminescent barometry, according to the invention, was prepared as described in Example 2, from:

20.0 g dichloromethane
2.98 g GE 118 RTV
0.015 g RuTMPCl Ru complex, tris [(3,4,7,8) tetramethyl-1,10 phenanthroline)]ruthenium (II) chloride hexahydrate
1.00 nonane

EXAMPLE 12

For purposes of comparison, a conventional coating for luminescent barometry was prepared as described at pages 3342 and 3343 of "Luminescent Barometry in Wind Tunnels."

Figure 1:
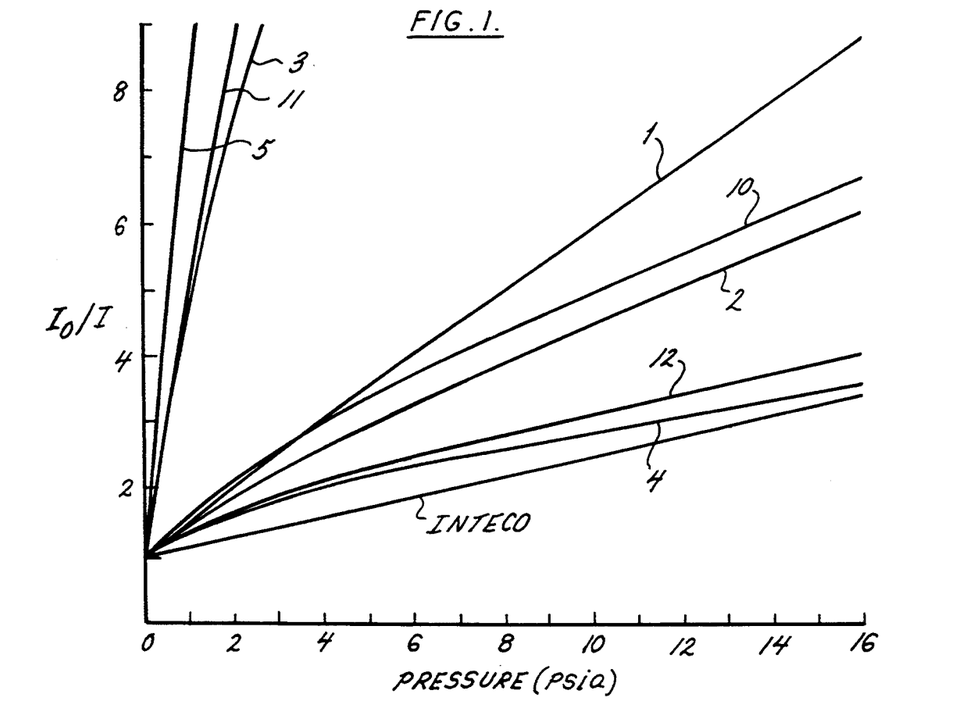
FIG. 1 is a plot comparing the sensitivity of applicants' photoluminescent materials to conventional photoluminescent materials.
Figure 2:
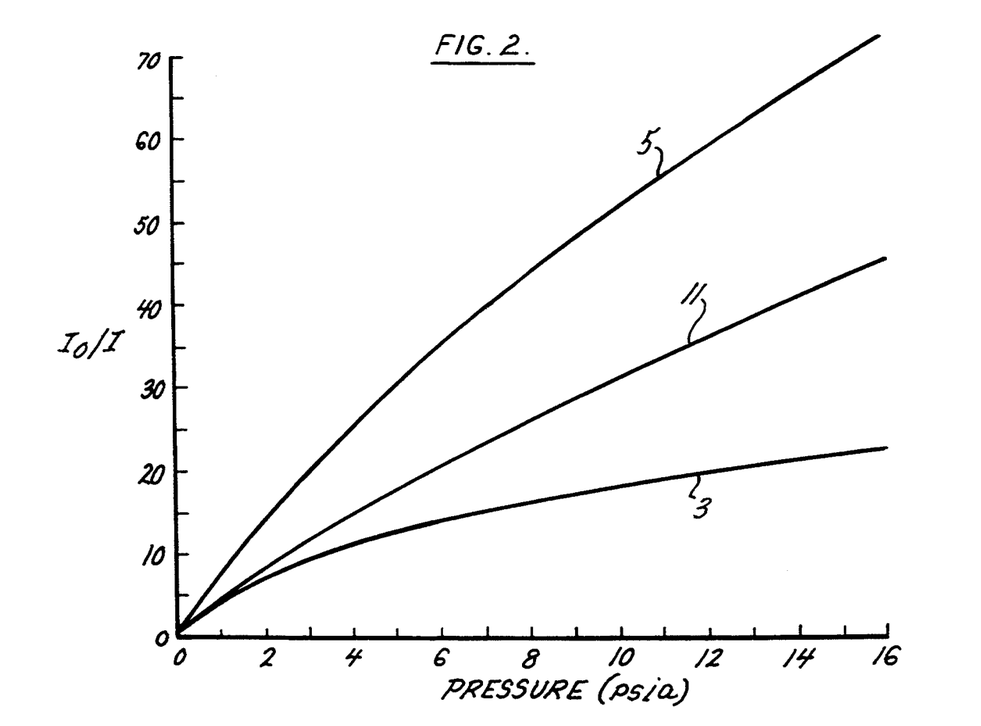
FIG. 2 is an expanded view of a portion of FIG. 1.

The materials produced in Examples 1-12 were used to produce test coupons and were tested to determine effectiveness and sensitivity when used in luminescent barometry. The results of those tests are shown in FIGS. 1 and 2. For the material of Examples 1-11, the coupons were cleaned aluminum strips coated with a white base coat of nine parts GE SS 4044 clear silicone primer and one part titanium dioxide (DuPont R900). This primer has been found especially effective at maintaining the sensitivity of the photoluminescent coating. It is believed that this base coat prevents the active ingredient from migrating into the base coat thus keeping more molecules of the active ingredient available for oxygen quenching. This formulation has been found to be up to one and one half times as effective as conventional base coats. For the material of Example 12 the coupons were prepared as described by Kavandi et al. in "Luminescent Barometry in Wind Tunnels." All materials were applied by spraying by conventional air brush equipment to a thickness of 10 to 15 microns ($\mu$m).

The coupons were placed in a cell in which the temperature and pressure could be varied. The coupons were illuminated with light of the described preferred wavelengths and the emitted luminescence was measured using an SLM 4800 spectrofluorometer and the data recorded by hand. The effective excitation wavelengths and the wavelengths of emitted light for the materials described are shown in Table II.

TABLE II

| Example(s) | Usable Excitation Wavelength Range | Preferred Excitation Wavelength Range | Emission Wavelength Range |
|---|---|---|---|
| 1,2,3,4,8,9 | 250–520 nm | 400–490 nm | 580–650 nm |
| 5,6,10,12 | 250–400 or 480–550 nm | 350–400 or 510–540 nm | 615–690 nm |
| 7 | 250–380 nm | 330–340 nm | 470–530 nm |
| 11 | 250–500 nm | 380–480 nm | 565–640 nm |

In FIGS. 1 and 2, the data is plotted in conventional Stern-Volmer plots where $I_o$ is the luminescence intensity observed in the absence of oxygen and I is the measured luminescence intensity at a given air pressure and 25° C. Each plot is numbered according to the Example in which it was produced. FIG. 1 also contains a plot of the published data for a promoted product (Inteco). The Inteco product was not available for direct comparison.

Figure 3:
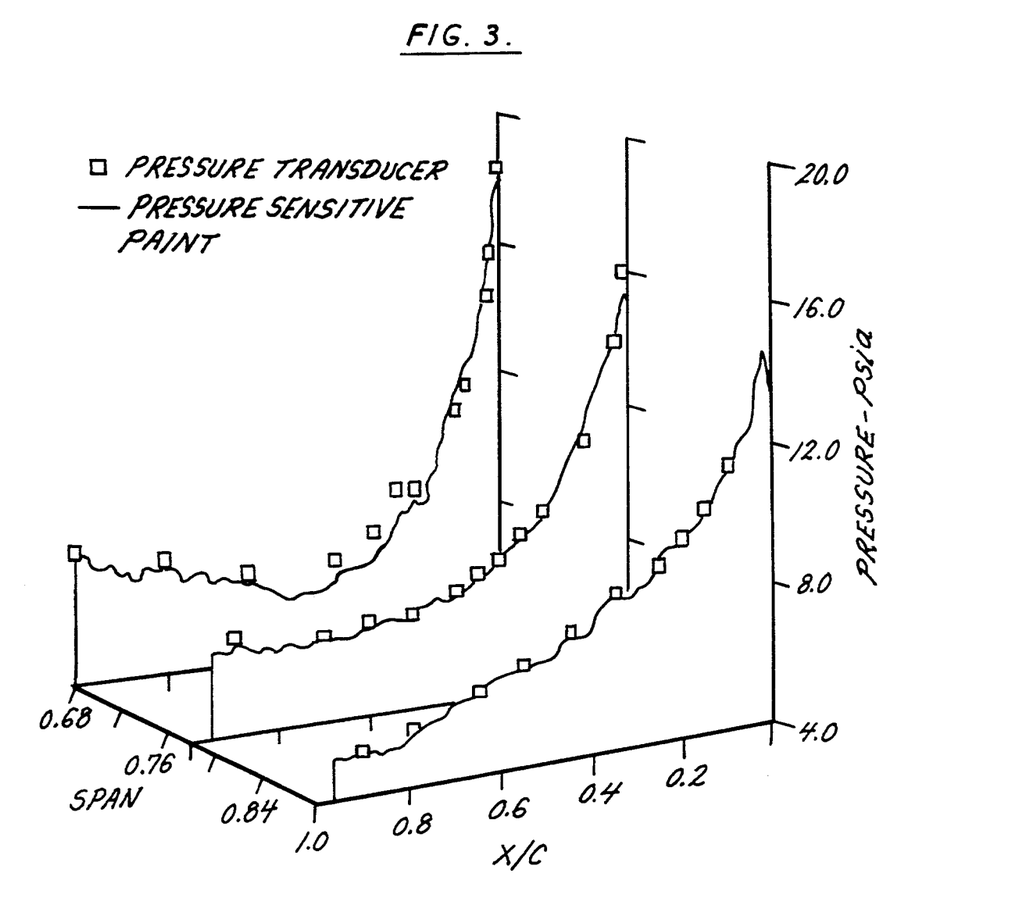
FIG. 3 is a comparison of pressure distribution measurements on an F-15 wing at mach 1.2 and 0° angle of attack.

FIG. 3 is a comparison of luminescent barometry data generated with the material described in Example 1, and data generated by conventional pressure taps. The Example 1 material was coated on an F-15 model as described above, and the model tested in a conventional wind tunnel. One wing of the F-15 model was instrumented with conventional pressure taps along lines placed front to back at three spanwise stations of the wing. FIG. 3 shows these stations as the decimal fraction of the distance from the wing root to the wing tip. The taps were placed along the upper surface of the airfoil from the leading edge to the trailing edge. The location of the taps and the luminescence readings were taken at the positions designated X/C in FIG. 3. The designation X/C is the decimal fraction of the distance from the leading edge to the trailing edge of the airfoil. As can be seen in FIG. 3, the luminescent barometry data matched that of the pressure taps to a very high degree. Moreover, the luminescent data provided continuous pressure information across the wing. The luminescent data was collected by illuminating the model with light of the described wavelength and the luminescence data was collected by a digital video camera and recorded in a desktop computer. The pressure data was printed out as the pixel maps shown in FIG. 3. Luminescence was converted to pressure using the following procedure. First, a digital image of the luminescence emitted from the surface of the model at a uniform pressure reference condition, in this case at atmospheric pressure, was acquired with the CCD camera. Then, a digital image of the surface luminescence at the desired aerodynamic test condition was acquired, as described above. Next, the reference image was divided by the test image. Using an experimentally derived calibration function as shown in FIGS. 1 and 2, the absolute pressure was calculated by the computer for each pixel in the image.

It will be understood by one skilled in the art that various modifications can be made to the invention disclosed herein without departing from the spirit of the invention. The invention is not to be limited to the specifics of the examples given herein for purposes of illustration but only by the scope of the claims appended hereto and their equivalents.

We claim as our invention:

1. A material for use in wind tunnel luminescent barometry comprising a combination of a photoluminescent compatible resin in a solvent vehicle, the resin being permeable to oxygen and the combination of resin and vehicle also containing an effective amount of a photoluminescent active agent to indicate the pressure on a coated surface, the photoluminescent material being selected from the group consisting of photoluminescent active ruthenium complexes, photoluminescent active mixtures of pyrene and perylene and mixtures thereof, the combination being effective to uniformly coat surfaces to be examined by luminescent barometry and the photoluminescent active agent being effective to indicate the barometric pressure on said coated surfaces by oxygen quenching of excited photoluminescence.

2. The material of claim 1 wherein the resin is a siloxane polymer.

3. The material of claim 1 wherein the resin is selected from the group consisting of cross-linked rubbery siloxane polymers and propyne polymers.

4. The material of claim 1 wherein the resin is poly [1-(trimethylsilyl) propyne].

5. The material of claim 1 wherein the photoluminescent active agent is [Ru (Ph$_2$phen)$_3$] Cl$_2$.

6. The material of claim 1 wherein the photoluminescent active agent is an equimolar mixture of pyrene and perylene.

7. The material of claim 1 wherein the material contains silica gel.

8. The material of claim 1 wherein the photoluminescent active agent is RuTMPCl.

9. A material for use in wind tunnel luminescent barometry comprising a combination of an effective amount of poly [1-(trimethylsilyl) propyne] resin, in a compatible solvent vehicle, to provide a uniform coating on surfaces to be examined by luminescent barometry, the combination further containing a photoluminescent active agent effective to produce pressure maps of aerodynamic surfaces by oxygen quenching of excited photoluminescence.

10. The material of claim 9 wherein the photoluminescent active agent is selected from the group consisting of photoluminescent active ruthenium complexes, photoluminescent active mixtures of pyrene and perylene, photoluminescent active platinum porphyrin complexes and mixtures thereof.

11. The material of claim 9 wherein the photoluminescent active material is [Ru (Ph$_2$phen)$_3$] Cl$_2$.

12. The material of claim 9 wherein the photoluminescent active material is an equimolar mixture of pyrene and perylene.

13. The material of claim 9 wherein the photoluminescent active material is PtOEP.

14. The material of claim 9 wherein the material contains silica gel.

15. The material of claim 9 wherein the photoluminescent active agent is RuTMPCl.

16. In a method of conducting a wind tunnel luminescent barometric examination of a surface, the improvement comprising coating the surface with a combination of a photoluminescent compatible resin in a solvent vehicle, the combination also containing a photoluminescent active agent selected from the group consisting of photoluminescent active ruthenium complexes, photoluminescent active mixtures of pyrene and perylene and mixtures thereof, the combination being effective to uniformly coat the surface to be examined by luminescent barometry and the photoluminescent active agent being effective to indicate the barometric pressure on the coated surface by photoluminescence, photo exciting the material on the coated surface and measuring the luminescence of the material.

17. The method of claim 16 wherein the resin is a siloxane polymer.

18. The method of claim 16 wherein the resin is a cross-linked rubbery siloxane polymer.

19. The method of claim 16 wherein the resin is poly [1-(trimethylsilyl) propyne].

20. The method of claim 16 wherein the photoluminescent active agent is [Ru (Ph$_2$phen)$_3$] Cl$_2$.

21. The method of claim 16 wherein the photoluminescent active agent is an equimolar mixture of pyrene and perylene.

22. The method of claim 16 wherein the combination contains silica gel.

23. The method of claim 16 wherein the photoluminescent active agent is RuTMPCl.

24. In a method of conducting a wind tunnel luminescent barometric examination of a surface the improvement comprising coating the surface with an effective amount of a combination of an effective amount of a poly [1-(trimethysilyl) propyne] resin, and a resin selected from the group consisting of cross-linked rubbery siloxane polymers, [and poly [1-(trimethysilyl) propyne] resin,] in a compatible solvent vehicle, the combination also containing a photoluminescent active agent effective to produce pressure maps of aerodynamic surfaces by oxygen quenching of excited photoluminescence, the combination being effective to uniformly coat the surface to be examined by luminescent barometry and the photoluminescent active agent being effective to indicate the barometric pressure on the coated surface by oxygen quenching of photoluminescence, photo-exciting the material on the coated surface and measuring the luminescence of the material.

25. The method of claim 24 wherein the photoluminescent active agent is selected from the group consisting of photoluminescent active mixtures of pyrene and perylene, photoluminescent active platinum porphyrin complexes, photoluminescent active ruthenium complexes and mixtures thereof.

26. The method of claim 24 wherein the photoluminescent material is an equimolar mixture of pyrene and perylene.

27. The method of claim 24 wherein the photoluminescent material is PtOEP.

28. The method of claim 24 wherein the photoluminescent material is [Ru(Ph$_2$phen)$_3$ Cl$_2$.

29. The method of claim 24 wherein the photoluminescent active agent is RuTMPCl.

30. The method of claim 24 wherein the material contains silica gel.

* * * * *

UNITED STATES PATENT AND TRADEMARK OFFICE
CERTIFICATE OF CORRECTION

PATENT NO. : 5,359,887
DATED : November 1, 1994
INVENTOR(S) : Scott D. Schwab and Ram L. Levy It is certified that error appears in the above-identified patent and that said Letters Patent is hereby corrected as shown below:

Title page, Abstract, line 6, delete "($Ph_2phen)_2$" and insert -- $(Ph_2phen)_3$ --.

Column 1, line 28, delete "Polymer Preprints" and insert -- <u>Polymer Preprints</u> --.

Column 1, line 33, delete "science" and insert -- Science --.

Column 2, line 31, delete "sci." and insert -- Sci. --.

Column 6, line 5, delete "Cl2" and insert -- $Cl_2$ --.

Column 10, line 8, delete "$(Ph_2phen)3$" and insert -- $(Ph_2phen)_3$ --.

Column 10, lines 22-23, delete "[and poly [1-(trimethysilyl) propyne] resin,]".

Signed and Sealed this

Twenty-eight Day of March, 1995

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,359,887
DATED :
INVENTOR(S) : November 1, 1994

Scott D. Schwab and Ram L. Levy

It is certified that error appears in the above-indentified patent and that said Letters Patent is hereby corrected as shown below:

On the title page, after item [76] Inventors: insert the following:

--[73] Assignee: McDonnell Douglas Corporation--.

Signed and Sealed this

Second Day of September, 1997

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,359,887
DATED : November 1, 1994
INVENTOR(S) : Scott D. Schwab, et. al.

It is certified that error appears in the above-indentified patent and that said Letters Patent is hereby corrected as shown below:

Title page, item [73], Assignee: should read--McDonnell Douglas Corporation.

Signed and Sealed this

Thirtieth Day of June, 1998

*Attest:*

BRUCE LEHMAN

*Attesting Officer*     *Commissioner of Patents and Trademarks*